(12) United States Patent
Arai

(10) Patent No.: US 11,505,192 B2
(45) Date of Patent: Nov. 22, 2022

(54) VEHICLE CONTROL APPARATUS

(71) Applicant: SUBARU CORPORATION, Tokyo (JP)

(72) Inventor: Shoto Arai, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 115 days.

(21) Appl. No.: 16/871,451

(22) Filed: May 11, 2020

(65) Prior Publication Data

US 2021/0009131 A1 Jan. 14, 2021

(30) Foreign Application Priority Data

Jul. 11, 2019 (JP) .............................. JP2019-129067

(51) Int. Cl.
*B60W 30/18* (2012.01)

(52) U.S. Cl.
CPC .................. *B60W 30/18063* (2013.01); *B60W 2510/0638* (2013.01); *B60W 2510/081* (2013.01); *B60W 2520/28* (2013.01)

(58) Field of Classification Search
CPC ..... B60W 2554/60; B60W 2510/0638; B60W 2510/081; B60W 2520/28
See application file for complete search history.

(56) References Cited

U.S. PATENT DOCUMENTS

| 2004/0215385 | A1* | 10/2004 | Aizawa | ..................... B60T 7/12 |
| | | | | 701/93 |
| 2007/0150158 | A1* | 6/2007 | Inoue | .............. B60W 30/18027 |
| | | | | 701/93 |
| 2015/0329090 | A1* | 11/2015 | Watanabe | ................. B60T 7/12 |
| | | | | 701/93 |
| 2016/0185350 | A1* | 6/2016 | Kelly | .................... B60W 30/18 |
| | | | | 701/94 |
| 2016/0325748 | A1* | 11/2016 | Mori | ..................... B60W 10/08 |
| 2019/0135297 | A1* | 5/2019 | Takahashi | ................ B60K 6/52 |
| 2019/0225218 | A1* | 7/2019 | Ishikawa | ............. B60W 30/146 |
| 2020/0031350 | A1* | 1/2020 | Nakamura | ............ B60W 30/18 |
| 2020/0398844 | A1* | 12/2020 | Ruybal | ................ B60W 10/119 |

FOREIGN PATENT DOCUMENTS

JP 2004-090679 A 3/2004

\* cited by examiner

*Primary Examiner* — Jeff A Burke
*Assistant Examiner* — Jerrod Irvin Davis
(74) *Attorney, Agent, or Firm* — McDermott Will & Emery LLP

(57) ABSTRACT

A vehicle control apparatus includes a controller configured to perform creep traveling control in which a vehicle is caused to travel regardless of an accelerator operation. When one or both of front wheels or one or both of rear wheels of the vehicle are determined as having moved onto a step by the controller after the creep traveling control starts, the controller causes a target vehicle speed of the creep traveling control to be lower than a first target vehicle speed until the remaining wheels out of the front wheels and the rear wheels are determined as having moved onto the step. The first target vehicle speed is equal to the target vehicle speed having been set before a time when the one or both of the front wheels or the one or both of the rear wheels are determined as having moved onto the step.

19 Claims, 6 Drawing Sheets

VEHICLE CONTROL APPARATUS

CROSS-REFERENCE TO RELATED APPLICATIONS

The present application claims priority from Japanese Patent Application No. 2019-129067 filed on Jul. 11, 2019, the entire contents of which are hereby incorporated by reference.

BACKGROUND

The technology relates to a vehicle control apparatus.

Creep traveling control is known as one type of vehicle traveling control. The creep traveling control causes a vehicle to travel regardless of an operation of an accelerator pedal performed by a driver. Reference is made to Japanese Unexamined Patent Application Publication No. 2004-090679, for example. The creep traveling control starts when the driver releases a brake pedal while the vehicle is stopped by an operation of the brake pedal. In the creep traveling control, a vehicle speed of the vehicle is controlled so as to approach a target vehicle speed.

SUMMARY

An aspect of the technology provides a vehicle control apparatus including a controller configured to perform creep traveling control in which a vehicle is caused to travel regardless of an accelerator operation. When one or both of front wheels or one or both of rear wheels of the vehicle are determined as having moved onto a step by the controller after the creep traveling control starts, the controller causes a target vehicle speed of the creep traveling control to be lower than a first target vehicle speed until remaining wheels out of the front wheels and the rear wheels are determined as having moved onto the step by the controller. The first target vehicle speed is equal to the target vehicle speed having been set before a time when the one or both of the front wheels or the one or both of the rear wheels are determined as having moved onto the step.

An aspect of the technology provides a vehicle control apparatus including circuitry configured to perform creep traveling control in which the vehicle is caused to travel regardless of an accelerator operation. When one or both of front wheels or one or both of rear wheels of the vehicle are determined as having moved onto a step after the creep traveling control starts, the circuitry causes a target vehicle speed of the creep traveling control to be lower than a first target vehicle speed until remaining wheels out of the front wheels and the rear wheels are determined as having moved onto the step. The first target vehicle speed is equal to the target vehicle speed having been set before a time when the one or both of the front wheels or the one or both of the rear wheels are determined as having moved onto the step.

BRIEF DESCRIPTION OF THE DRAWINGS

The accompanying drawings are included to provide a further understanding of the technology and are incorporated in and constitute a part of this specification. The drawings illustrate example embodiments and, together with the specification, serve to explain the principles of the technology.

DETAILED DESCRIPTION

A shock is applied to a vehicle traveling over a step when the driving wheels are moving onto the step, which can make the driver feel uncomfortable. Thus, a technique of reducing such a shock applied to the vehicle has been required. When a vehicle under the creep traveling control passes over a step, for example, the front wheels of the vehicle move onto the step first, which temporarily decelerates the vehicle. Thereafter, the vehicle is accelerated to around a target vehicle speed, and then the rear wheels move onto the step. This can give a relatively large shock to the vehicle not only when the front wheels move onto the step but also when the rear wheels move onto the step.

It is desirable to provide a vehicle control apparatus that reduces a shock applied to a vehicle while creep traveling control is executed.

Some embodiments of the technology will now be described in detail with reference to the accompanying drawings. Note that the following description is directed to illustrative examples of the technology and not to be construed as limiting to the technology. Factors including, without limitation, numerical values, shapes, materials, components, positions of the components, and how the components are coupled to each other are illustrative only and not to be construed as limiting to the technology. Further, elements in the following example embodiments that are not recited in a most-generic independent claim of the technology are optional and may be provided on an as-needed basis. The drawings are schematic and are not intended to be drawn to scale.

Throughout the present specification and the drawings, elements having substantially the same function and configuration are denoted with the same numerals to avoid any redundant description.

[Exemplary Configuration of Vehicle]

An exemplary configuration of a vehicle 1 that includes a control apparatus 100 according to an example embodiment of the technology will now be described with reference to FIGS. 1 and 2.

Figure 1:
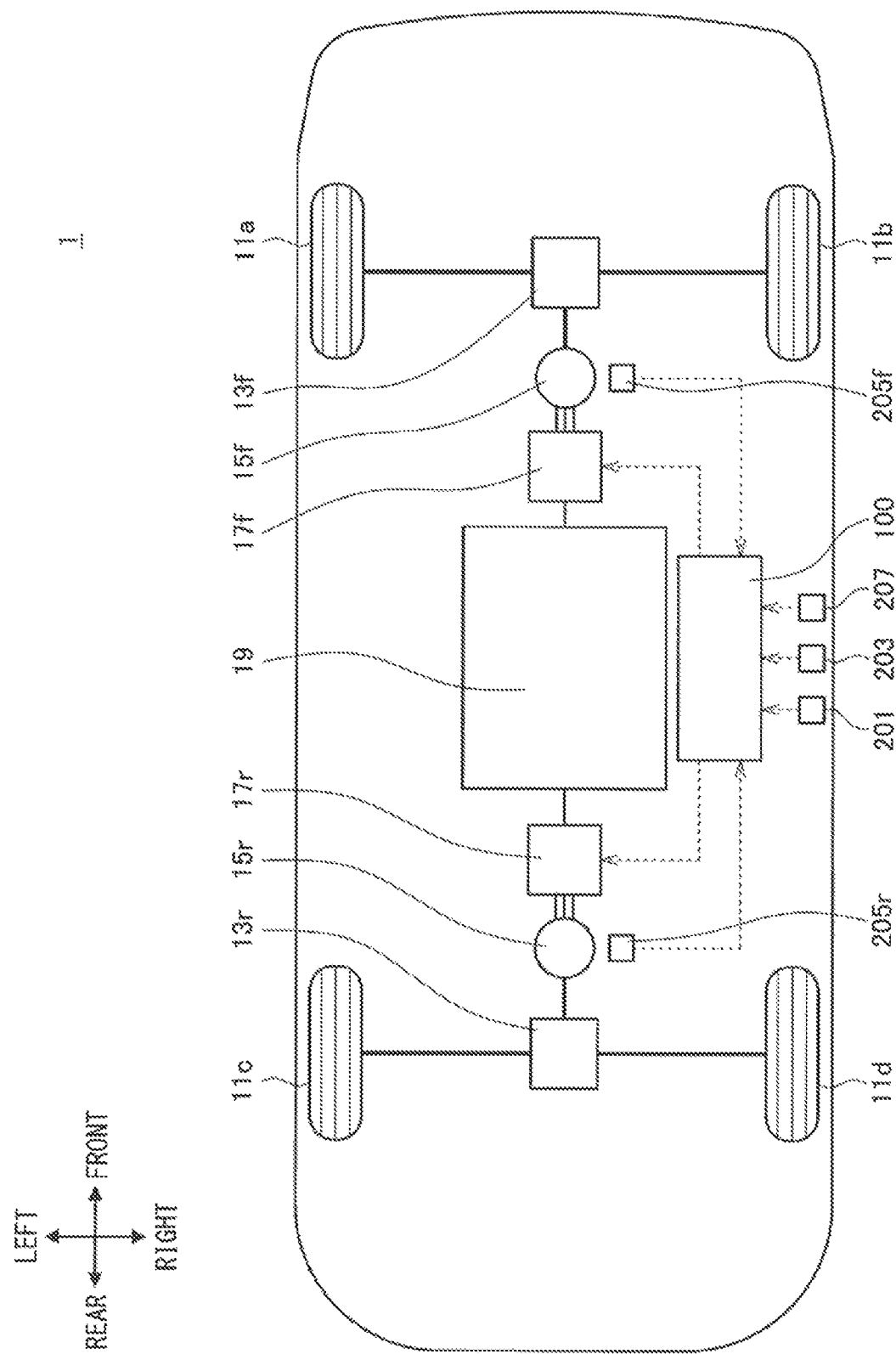
FIG. 1 is a schematic diagram illustrating an exemplary configuration of a vehicle that includes a control apparatus according to one example embodiment of the technology.

FIG. 1 is a schematic diagram illustrating an exemplary configuration of the vehicle 1.

In FIG. 1, the vehicle 1 is oriented in a traveling direction or frontward direction. A direction opposite to the traveling direction corresponds to a rearward direction. Rightward and leftward directions are defined on the basis of the vehicle 1 oriented in the traveling direction.

The vehicle 1 may be an electric vehicle that includes a front-wheel motor 15f and a rear-wheel motor 15r as power sources, for example. The vehicle 1 may travel using a driving force outputted from the motors. In one embodiment, the front-wheel motor 15f may serve as a "first motor". In one embodiment, the rear-wheel motor 15r may serve as a "second motor".

Note that the vehicle 1 described below is mere example of a vehicle that includes the control apparatus according to an example embodiment of the technology. The configuration of the vehicle that includes the control apparatus according to an example of the technology should not be limited to the configuration of the vehicle 1 described below.

For example, as illustrated in FIG. 1, the vehicle 1 may include front wheels 11a and 11b, rear wheel 11c and 11d, a front differential 13f, a rear differential 13r, the front-wheel motor 15f, the rear-wheel motor 15r, inverters 17f and 17r, and a battery 19. The vehicle 1 may include the control apparatus 100, an accelerator position sensor 201, a brake sensor 203, a front-wheel-motor revolution sensor 205f, a rear-wheel-motor revolution sensor 205r, and a speed sensor 207. In one embodiment, the front-wheel-motor revolution sensor 205f may serve as a "first revolution sensor". In one embodiment, the rear-wheel-motor revolution sensor 205r may serve as a "second revolution sensor".

The front-wheel motor 15f may output a driving force to drive the front wheels 11a and 11b. The front wheel 11a may correspond to a left front wheel, and the front wheel 11b may correspond to a right front wheel.

The front-wheel motor 15f may be driven by electric power received from the battery 19, for example. The front-wheel motor 15f may be coupled to the front differential 13f. The front differential 13f may be coupled to the front wheels 11a and 11b via a driving shaft. A driving force outputted from the front-wheel motor 15f may be transmitted to the front differential 13f and distributed by the front differential 13f to the front wheels 11a and 11b.

The front-wheel motor 15f may be, for example, a polyphase alternating current motor coupled to the battery 19 via the inverter 17f. A direct current supplied from the battery 19 may be converted by the inverter 17f into an alternating current. The alternating current may then be supplied to the front-wheel motor 15f. Optionally, the front-wheel motor 15f may also serve as a power generator that generates electric power using kinetic energy of the front wheels 11a and 11b while the vehicle 1 is decelerating. An alternating current generated by the front-wheel motor 15f may be converted by the inverter 17f into a direct current. The direct current may then be supplied to the battery 19 to charge the battery 19.

The rear-wheel motor 15r may output a driving force to drive the rear wheels 11c and 11d. The rear wheel 11c may correspond to a left rear wheel, and the rear wheel 11d may correspond to a right rear wheel.

The rear-wheel motor 15r may be driven by electric power received from the battery 19, for example. The rear-wheel motor 15r may be coupled to the rear differential 13r. The rear differential 13r may be coupled to the rear wheels 11c and 11d via a driving shaft. A driving force outputted from the rear-wheel motor 15r may be transmitted to the rear differential 13r and distributed by the rear differential 13r to the rear wheels 11c and 11d.

The rear-wheel motor 15r may be, for example, a polyphase alternating current motor coupled to the battery 19 via the inverter 17r. A direct current supplied from the battery 19 may be converted by the inverter 17r into an alternating current. The alternating current may then be supplied to the rear-wheel motor 15r. Optionally, the rear-wheel motor 15r may also serve as a power generator that generates electric power using kinetic energy of the rear wheels 11c and 11d while the vehicle 1 is decelerating. An alternating current generated by the rear-wheel motor 15r may be converted by the inverter 17r into a direct current. The direct current may then be supplied to the battery 19 to charge the battery 19.

The accelerator position sensor 201 may detect an accelerator position and output the detected accelerator position. The accelerator position is the quantity of an operation of an accelerator pedal performed by a driver.

The brake sensor 203 may detect a braking operation quantity and output the detected braking operation quantity. The braking operation quantity is the quantity of an operation of a brake pedal performed by the driver.

The front-wheel-motor revolution sensor 205f may detect the number of revolutions of the front-wheel motor 15f and output the detected number of revolutions.

The rear-wheel-motor revolution sensor 205r may detect the number of revolutions of the rear-wheel motor 15r and output the detected number of revolutions.

The speed sensor 207 may detect a traveling speed or vehicle speed of the vehicle 1 and output the detected vehicle speed.

The control apparatus 100 may include, for example, a central processing unit (CPU), which is an arithmetic processing unit, a read only memory (ROM), which is a memory storing programs and operation parameters to be used by the CPU, and a random access memory, which is a memory temporarily holding parameters configured to appropriately vary during the execution of the CPU and other data items.

Figure 2:
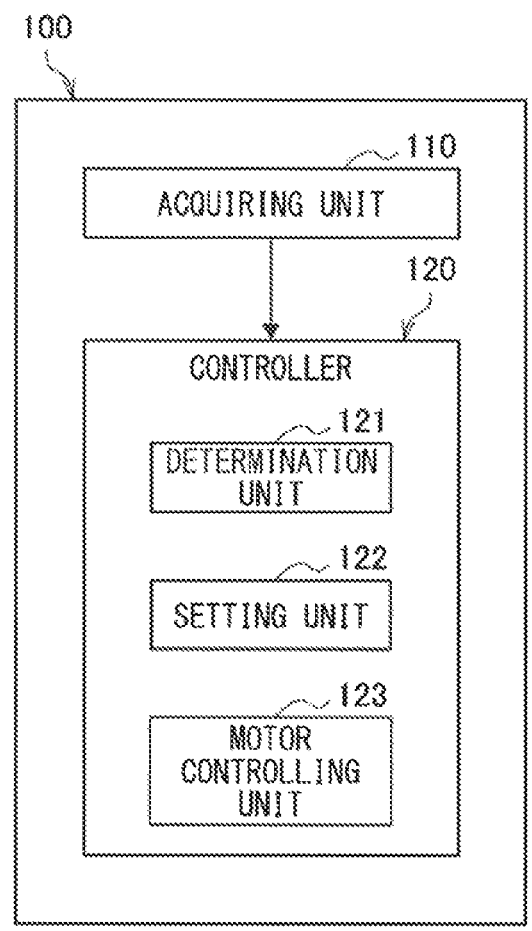
FIG. 2 is a block diagram illustrating an exemplary configuration of the control apparatus illustrated in FIG. 1.

FIG. 2 is a block diagram illustrating an exemplary configuration of the control apparatus 100.

As illustrated in FIG. 2, the control apparatus 100 may include an acquiring unit 110 and a controller 120, for example.

The acquiring unit 110 may acquire various pieces of data to be used in a process performed by the controller 120 and output the acquired data to the controller 120. For example, the acquiring unit 110 may acquire various pieces of data from the accelerator position sensor 201, the brake sensor 203, the front-wheel-motor revolution sensor 205f, the rear-wheel-motor revolution sensor 205r, and the speed sensor 207 by communicating with these sensors.

The controller 120 may control an operation of each device in the vehicle 1 to control the travel of the vehicle 1. For example, the controller 120 may include a determination unit 121, a setting unit 122, and a motor controlling unit 123.

The determination unit 121 may make various determinations on the basis of the data received from the acquiring unit 110. The results of the determinations by the determination unit 121 may be used in various processes performed by the controller 120.

The setting unit 122 may set a target vehicle speed of creep traveling control described below. The set target vehicle speed may be stored in a storage of the control apparatus 100, for example.

The motor controlling unit 123 may control operations of the front-wheel motor 15f and the rear-wheel motor 15r. For example, the motor controlling unit 123 may control an electric supply between the battery 19 and the front-wheel motor 15f by controlling an operation of a switching device in the inverter 17f. The motor controlling unit 123 may thereby control generation of a driving force and electric power at the front-wheel motor 15f. The motor controlling unit 123 may control an electric supply between the battery 19 and the rear-wheel motor 15r by controlling an operation of a switching device in the inverter 17r. The motor controlling unit 123 may thereby control generation of a driving force and electric power at the rear-wheel motor 15r.

The controller 120 is configured to perform creep traveling control in which the vehicle 1 is caused to travel regardless of an accelerator operation. In the creep traveling control, the controller 120 may cause a vehicle speed of the vehicle 1 to approach the target vehicle speed. For example, the target vehicle speed of the creep traveling control may be set by the setting unit 122, as described above. The motor controlling unit 123 may then control outputs of the front-wheel motor 15f and the rear-wheel motor 15r so that an actual vehicle speed of the vehicle 1 approaches the target vehicle speed of the creep traveling control.

Note that the target vehicle speed of the creep traveling control may be set to a speed lower than a target vehicle speed of cruise control. For example, the target vehicle speed of the creep traveling control may be set to a speed equal to or lower than a speed of ten kilometers per hour (10 km/h). Hereinafter, the target vehicle speed of the creep traveling control may also be simply referred to as "target vehicle speed".

The control apparatus 100 may communicate with various devices mounted in the vehicle 1, as described above. The communication between the control apparatus 100 and these devices may be established via a controller area network (CAN), for example.

Functions of the control apparatus 100 according to the example embodiment may be at least partially shared between several control apparatuses. Alternatively, functions of the control apparatus 100 may be implemented by a single control apparatus. In a case where functions of the control apparatus 100 are at least partially shared between several control apparatuses, these control apparatuses may be coupled to each other via a communication bus, such as a CAN.

As described above, the controller 120 of the control apparatus 100 is configured to perform the creep traveling control. When the front wheels 11a and 11b or the rear wheels 11c and 11d are determined as having moved onto a step by the controller after the creep traveling control starts, the controller 120 causes the target vehicle speed of the creep traveling control to be lower than a first target vehicle speed until the remaining driving wheels out of the front wheels 11a and 11b and the rear wheels 11c and 11d are determined as having moved onto the step by the controller. The first target vehicle speed may correspond to the vehicle speed of the vehicle 1 detected when the front wheels 11a and 11b or the rear wheels 11c and 11d are determined as having moved onto the step for the first time. It is therefore possible to reduce a shock applied to the vehicle 1 during the execution of the creep traveling control. The process related to the creep traveling control executed by the controller 120 of the control apparatus 100 is described in detail below.

Note that the wording "the driving wheels are determined as having moved onto a step" may refer, for example, to at least one of the following conditions: the driving wheels are determined as having begun moving onto the step; the driving wheels are determined as now moving on the step (i.e., in a state between the beginning of the movement onto the step and the completion of the movement onto the step); or the driving wheels are determined as having already moved onto the step.

[Exemplary Operations of Control Apparatus]

Exemplary operations of the control apparatus 100 according to an example embodiment of the technology will now be described with reference to FIGS. 3 to 6.

Figure 3:
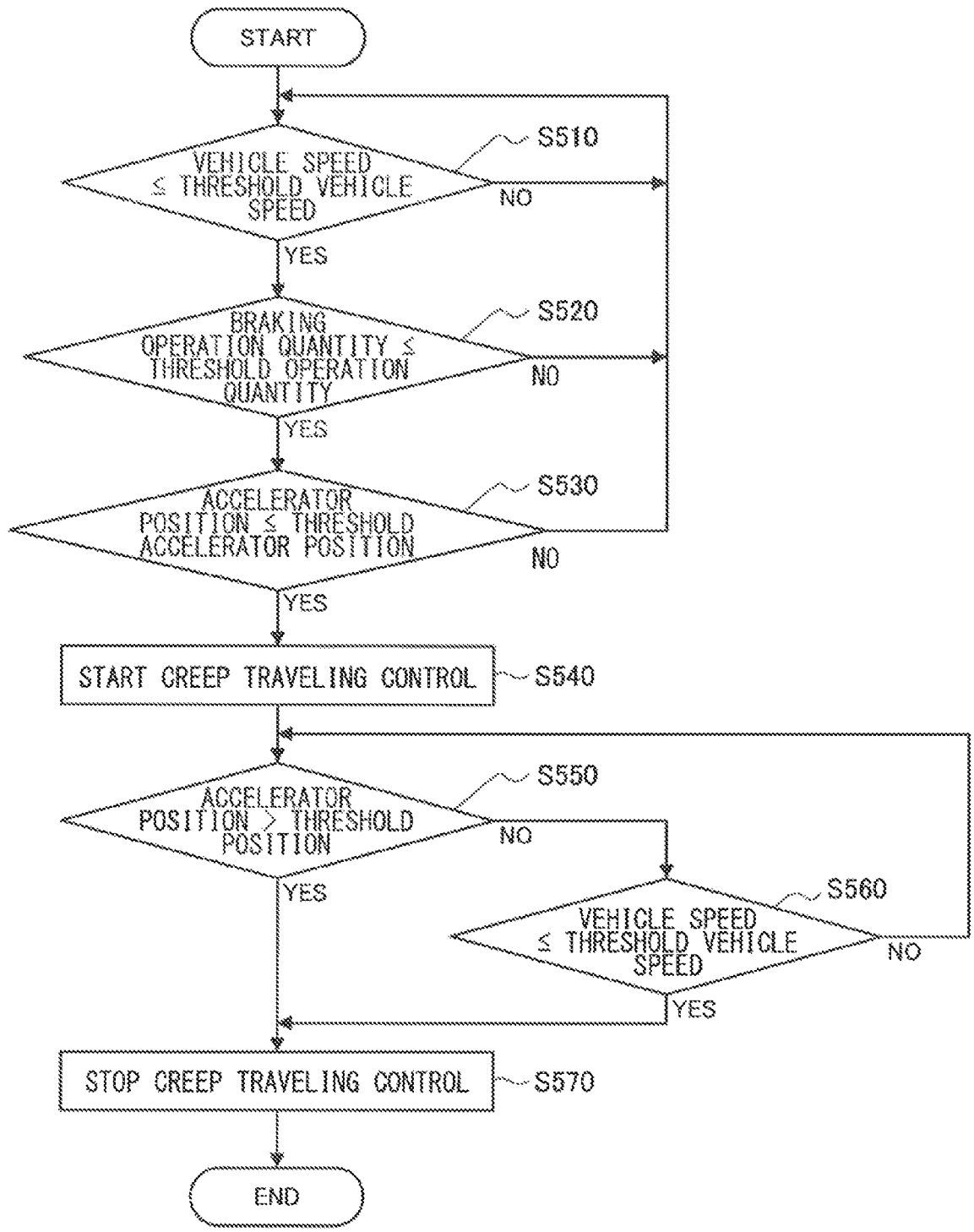
FIG. 3 is a flowchart illustrating an exemplary process flow to start or stop creep traveling control executed by the control apparatus illustrated in FIG. 1.

FIG. 3 is a flowchart illustrating an exemplary process to start or stop the creep traveling control executed by the controller 120 of the control apparatus 100. The control flow illustrated in FIG. 3 may be repeated while the power system of the vehicle 1 is activated.

Once the control flow illustrated in FIG. 3 starts, the determination unit 121 may determine whether an actual vehicle speed is equal to or lower than a threshold speed in Step S510. If it is determined that the vehicle speed is equal to or lower than the threshold speed (Step S510: YES), the procedure may proceed to Step S520. In contrast, if it is determined that the vehicle speed is greater than the threshold speed (Step S510: NO), the process in Step S510 may be repeated.

The threshold speed may take such a value that determines whether the vehicle is stopped. The threshold speed may be set to a speed around zero kilometers per hour (0 km/h), for example. In other words, if it is determined that the vehicle speed is equal to or lower than the threshold speed, a determination may be made that the vehicle 1 is stopped.

If it is determined that the vehicle speed is equal to or lower than the threshold speed in Step S510, the determination unit 121 may determine whether the braking operation quantity is equal to or less than a threshold operation quantity in Step S520. If it is determined that the braking operation quantity is equal to or less than the threshold operation quantity (Step S520: YES), the procedure may proceed to Step S530. In contrast, if it is determined that the braking operation quantity is greater than the threshold operation quantity (Step S520: NO), the procedure may return to Step S510.

The threshold operation quantity may take such a value that whether a braking operation (e.g., an operation of pressing down the brake pedal) is performed. For example, the threshold operation quantity may be set to a value around the braking operation quantity detected when the brake pedal is not pressed down. In other words, if it is determined that the braking operation quantity is equal to or less than the threshold operation quantity, a determination may be made that no braking operation is performed.

If it is determined that the braking operation quantity is equal to or less than the threshold operation quantity (Step S520: YES), the determination unit 121 may determine whether the accelerator position is equal to or less than a threshold position in Step S530. If it is determined that the accelerator position is equal to or less than the threshold position (Step S530: YES), the procedure may proceed to Step S540. In contrast, if it is determined that the accelerator position is greater than the threshold position (Step S530: NO), the procedure may return to Step S510.

The threshold position may take such a value that whether an accelerator operation (e.g., an operation of pressing down the accelerator pedal) is performed. For example, the threshold position may be set to a value around the accelerator position detected when the accelerator pedal is not pressed down. In other words, if it is determined that the accelerator position is equal to or less than the threshold position, a determination may be made that no accelerator operation is performed.

If it is determined that the accelerator position is equal to or less than the threshold position (Step S530: YES), the controller 120 may start the creep traveling control in Step S540 to cause the vehicle speed to approach the target vehicle speed. The vehicle 1 may be thereby caused to travel regardless of the accelerator operation.

Thereafter, in Step S550, the determination unit 121 may determine whether the accelerator position is greater than the threshold position. If it is determined that the accelerator position is greater than the threshold position (Step S550: YES), the procedure may proceed to Step S570. In contrast, if it is determined that the accelerator position is equal to or less than the threshold position (Step S550: NO), the procedure may proceed to Step S560.

If it is determined that the accelerator position is greater than the threshold position (Step S550: YES), a determination may be made that the accelerator operation is performed during the execution of the creep traveling control.

If it is determined that the accelerator position is equal to or less than the threshold position (Step S550: NO), the determination unit 121 may determine whether the vehicle speed is equal to or lower than the threshold speed in Step S560. If it is determined that the vehicle speed is equal to or lower than the threshold speed (Step S560: YES), the procedure may proceed to Step S570. In contrast, if it is determined that the vehicle speed is greater than the threshold speed (Step S560: NO), the procedure may return to Step S550.

If it is determined that the vehicle speed is equal to or lower than the threshold speed (Step S560: YES), a determination may be made that the vehicle 1 is stopped as a result of a braking operation performed during the execution of the creep traveling control.

If it is determined that the accelerator position is greater than the threshold position (Step S550: YES) or if it is determined that the vehicle speed is equal to or lower than the threshold speed (Step S560: YES), the controller 120 may stop the creep traveling control in Step S570.

Thereafter, the control flow illustrated in FIG. 3 may end.

As described above, in the control flow illustrated in FIG. 3, the creep traveling control may start under a condition where the vehicle 1 is stopped, no braking operation is performed, and no accelerator operation is performed. For example, the creep traveling control may start when the driver releases the brake pedal while the vehicle 1 is stopped by the braking operation.

An exemplary process performed during the execution of the creep traveling control will now be described in detail with reference to FIG. 4.

Figure 4:
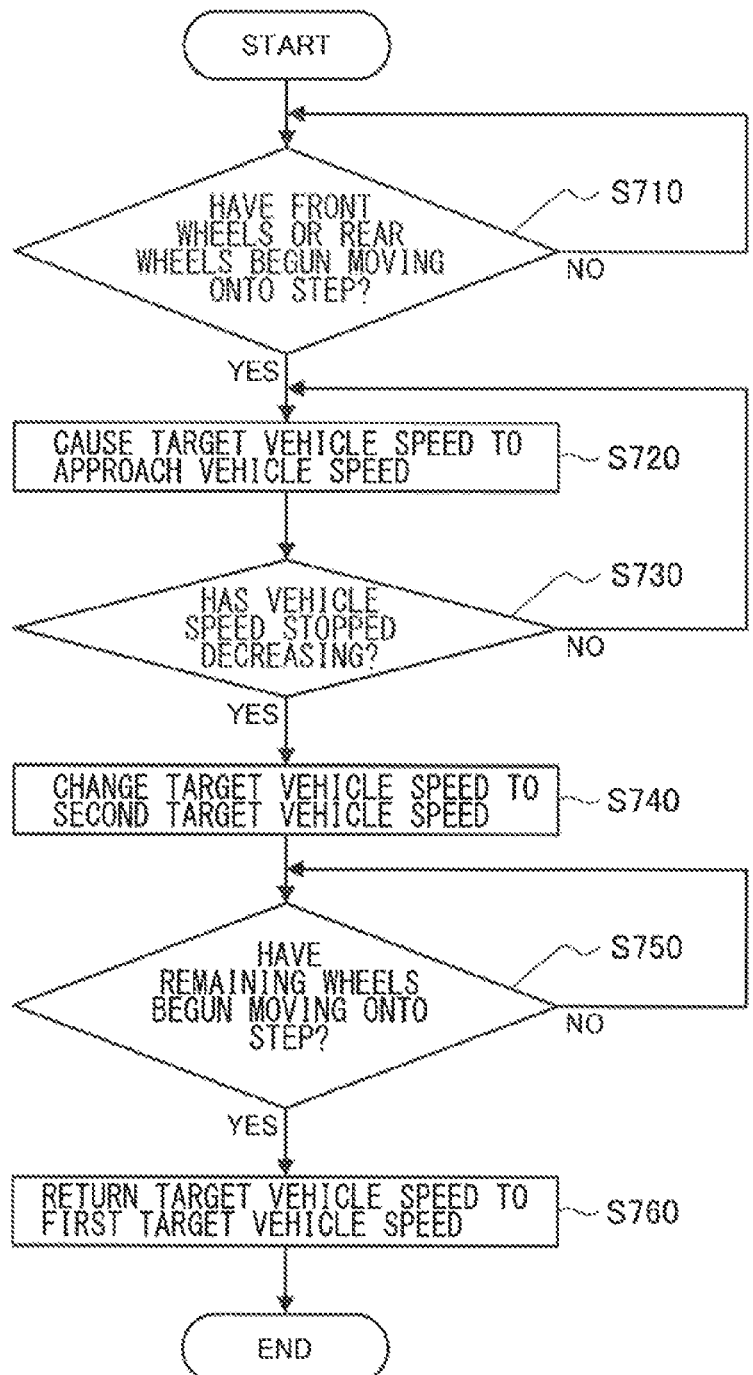
FIG. 4 is a flowchart illustrating an exemplary process flow executed by the control apparatus illustrated in FIG. 1 during the execution of the creep traveling control.

FIG. 4 is a flowchart illustrating an exemplary flow of the process executed by the controller 120 in the control apparatus 100 during the execution of the creep traveling control. The control flow illustrated in FIG. 4 may be repeated during the execution of the creep traveling control, for example.

Once the control flow illustrated in FIG. 4 starts, the determination unit 121 may determine whether the front wheels 11a and 11b or the rear wheels 11c and 11d (e.g., the front wheels 11a and 11b for forward traveling, and the rear wheels 11c and 11d for rearward traveling) have begun moving onto a step in Step S710. If the front wheels 11a and 11b or the rear wheels 11c and 11d are determined as having begun moving onto the step (Step S710: YES), the procedure may proceed to Step S720. In contrast, the front wheels 11a and 11b or the rear wheels 11c and 11d are not determined as having begun moving onto the step (Step S710: NO), the determination process in Step S710 may be repeated.

Note that the step may be a linear protrusion (e.g., speed bump) provided on a road surface or a joint between road surfaces different in height (e.g., between a roadway and a sidewalk).

Upon the start of the creep traveling control, the setting unit 122 may set the target vehicle speed to the first target vehicle speed. Thus, the determination process in Step S710 may be performed under a condition where the first target vehicle speed is set as the target vehicle speed. In other words, the first target vehicle speed may correspond to the target vehicle speed detected when the front wheels 11a and 11b or the rear wheels 11c and 11d are determined as having moved (or having begun moving) onto the step for the first time.

For example, the first target vehicle speed may be comparable to a speed of an automatic engine-powered vehicle while a creep phenomenon is generated (e.g., about 6 km/h).

The determination unit 121 may determine whether the front wheels 11a and 11b have begun moving onto the step on the basis of the result of the detection by the front-wheel-motor revolution sensor 205f, and determine whether the rear wheels 11c and 11d have begun moving onto the step on the basis of the result of the detection by the rear-wheel-motor revolution sensor 205r, for example.

The determination unit 121 may specify the deceleration rate of the front wheels 11a and 11b on the basis of the result of the detection by the front-wheel-motor revolution sensor 205f, for example. If the deceleration rate of the front wheels 11a and 11b is greater than a threshold deceleration rate, the determination unit 121 may determine that the front wheels 11a and 11b have begun moving onto the step. Additionally, the determination unit 121 may specify the deceleration rate of the rear wheels 11c and 11d on the basis of the result of the detection by the rear-wheel-motor revolution sensor 205r. If the deceleration rate of the rear wheels 11c and 11d is greater than the threshold deceleration rate, the determination unit 121 may determine that the rear wheels 11c and 11d have begun moving onto the step.

The description on an example embodiment is made on the precondition that a driving wheel decelerates when the deceleration rate takes a positive value and accelerates when the deceleration rate takes a negative value. The threshold deceleration rate may be such a value that whether an impact is applied to the driving wheels moving on the step. For example, the threshold deceleration rate may be set to a value smaller than an expected deceleration rate of the driving wheels to be provided by the application of the impact.

Alternatively, the determination as to whether the driving wheels have moved (or have begun moving) onto a step may be made in another method than the above-described method using the front-wheel-motor revolution sensor 205f and the rear-wheel-motor revolution sensor 205r.

For example, in a case where the vehicle 1 is provided with an acceleration sensor that detects an acceleration rate of the vehicle 1, the determination unit 121 may determine whether the driving wheels have moved onto a step on the basis of the result of the detection by the acceleration sensor.

For instance, when the acceleration rate of the vehicle 1 exceeds a threshold acceleration rate for the first time after the creep traveling control starts, the determination unit 121 may determine that the front wheels 11a and 11b or the rear wheels 11c and 11d have moved (or have begun moving) onto a step. The threshold acceleration rate may be set to such a value that whether an impact is applied to the driving wheels moving onto the step. Thereafter, when the acceleration rate of the vehicle 1 exceeds the threshold acceleration rate at the time when the remaining driving wheels out of the front wheels 11a and 11b and the rear wheels 11c and 11d are expected to reach the step, the determination unit 121 may determine that the remaining driving wheels have moved (or have begun moving) onto the step. Note that the expected time may be determined on the basis of a distance between the front wheels 11a and 11b and the rear wheels 11c and 11d, and the vehicle speed, for example.

As described above, the method of determining whether the driving wheels have moved onto a step should not be limited to a specific method. However, to improve accuracy of the determination as to whether the driving wheels have moved onto a step and appropriately determine which driving wheels of the front wheels 11a and 11b or the rear wheels 11c and 11d have moved onto a step, the determination may be made by the use of the front-wheel-motor revolution sensor 205f and the rear-wheel-motor revolution sensor 205r.

If the front wheels 11a and 11b or the rear wheels 11c and 11d are determined as having begun moving onto the step (Step S710: YES), the setting unit 122 may cause the target vehicle speed to approach the actual vehicle speed in Step S720.

If the front wheels 11a and 11b or the rear wheels 11c and 11d are determined as having begun moving onto the step (Step S710: YES), the vehicle speed may be decreased due to the driving wheels moving onto the step. The process in Step S720 may be repeated until a determination is made that the vehicle speed has stopped decreasing in Step S730 as described below. For example, when the front wheels 11a and 11b or the rear wheels 11c and 11d are determined as having begun moving onto a step, the setting unit 122 may cause the target vehicle speed of the creep traveling control to approach the actual vehicle speed until the vehicle speed stops decreasing. In one example, the setting unit 122 may decrease the target vehicle speed from the first target vehicle speed to the actual vehicle speed as the actual traveling speed decreases and keep the target vehicle speed equal to the actual vehicle speed.

This suppresses an application of an excessively large driving force to the vehicle 1 while the vehicle speed is decreasing due to the driving wheel(s) moving onto a step. A rapid acceleration of the vehicle is thereby suppressed when the vehicle speed has stopped decreasing, for example. Accordingly, it is possible to reduce a feeling of strangeness of the driver.

Thereafter, in Step S730, the determination unit 121 may determine whether the vehicle speed has stopped decreasing. If it is determined that the vehicle speed has stopped decreasing (Step S730: YES), the procedure may proceed to Step S740. In contrast, if it is not determined that the vehicle speed has stopped decreasing (Step S730: NO), the procedure may proceed to Step S720.

For example, the determination unit 121 may determine whether the vehicle speed has stopped decreasing on the basis of the result of detection by the speed sensor 207. For instance, after the front wheels 11a and 11b or the rear wheels 11c and 11d are determined as having begun moving onto the step (Step S710: YES), the determination unit 121 may determine that the vehicle speed has stopped decreasing on the basis of the detection by the speed sensor 207 that the vehicle speed having been decreasing begins to increase.

Alternatively, the determination as to whether the vehicle speed has stopped decreasing may be made in another method than that using the speed sensor 207. For example, the determination unit 121 may determine that the vehicle speed has stopped decreasing when a predetermined period of time has elapsed from the time when the front wheels 11a and 11b or the rear wheels 11c and 11d are determined as having begun moving onto the step (Step S710: YES). The predetermined period of time may be an expected duration of time before the vehicle speed has stopped decreasing due to the driving wheels moving onto the step.

If it is determined that the vehicle speed has stopped decreasing (Step S730: YES), the setting unit 122 may change the target vehicle speed from the first target vehicle speed to the second target vehicle speed that is lower than the first target vehicle speed.

For example, the second target vehicle speed may be lower than the first target vehicle speed but sufficiently high to move the remaining driving wheels out of the front wheels 11a and 11b and the rear wheels 11c and 11d onto the step.

As described above, when the front wheels 11a and 11b or the rear wheels 11c and 11d are determined as having begun moving onto a step, the target vehicle speed may be decreased from the first target vehicle speed with the decrease in the actual vehicle speed until the vehicle speed stops decreasing. At the time when it is determined that the vehicle speed has stopped decreasing (Step S730: YES), the target vehicle speed may be substantially equal to the actual vehicle speed that has stopped decreasing. Thereafter, in Step S740, the setting unit 122 may change the target vehicle speed from the first target vehicle speed to the second target vehicle speed.

To suppress the occurrence of a rapid change in the vehicle speed, the setting unit 122 may gradually change the target vehicle speed to the second target vehicle speed. In other words, the setting unit 122 may cause the target vehicle speed to approach the second target vehicle speed with time. In this case, the change rate (i.e., the amount of change per unit of time) of the target vehicle speed may be constant or change over time. For example, the change rate of the target vehicle speed may be set to such a rate that reduces a feeling of strangeness of the driver caused by the change in the vehicle speed. Additionally, the change rate of the target vehicle speed may be set so that the target vehicle speed reaches the second target vehicle speed before the remaining driving wheels out of the front wheels 11a and 11b and the rear wheels 11c and 11d move onto the step.

For example, to move the remaining driving wheels out of the front wheels 11a and 11b and the rear wheels 11c and 11d onto the step while reducing a shock to be applied to the vehicle 1, the setting unit 122 may adjust the second target vehicle speed on the basis of the decrease in the vehicle speed after the front wheels 11a and 11b or the rear wheels 11c and 11d are determined as having begun moving onto the step. The decrease in the vehicle speed may correspond to a difference between the vehicle speed at the time when the vehicle speed has stopped decreasing and the first target vehicle speed.

It is expected that a higher step causes a greater decrease in the vehicle speed. A greater decrease in the vehicle speed requires a greater vehicle speed to move the driving wheels onto the step, generating a need for an increase of the second target vehicle speed. To reduce a shock to be applied to the vehicle 1 when the remaining driving wheels out of the front wheels 11a and 11b and the rear wheels 11c and 11d are moving onto the step, the second target vehicle speed may be decreased as much as possible so that the actual vehicle speed is decreased as much as possible. Accordingly, to move the remaining driving wheels out of the front wheels 11a and 11b and the rear wheels 11c and 11d onto the step while reducing a shock to be applied to the vehicle 1, the setting unit 122 may increase the second target vehicle speed as much as possible as the decrease in the vehicle speed becomes greater.

To move the remaining driving wheels out of the front wheels 11a and 11b and the rear wheels 11c and 11d onto the step while reducing a shock to be applied to the vehicle 1 and appropriately reducing a feeling of strangeness of the driver, the second target vehicle speed may be prohibited from being adjusted if the decrease in the vehicle speed is less than a threshold decrease amount. The threshold decrease amount may be set to such a value that it is possible to determine, under the condition where the second target vehicle speed is set as an expected minimum vehicle speed required to move the driving wheels onto the step, whether the decrease in the vehicle speed is greater enough to make the driver have a relatively strong feeling of strangeness. In one embodiment, the threshold decrease amount may serve as a "threshold".

For example, when the decrease in the vehicle speed is less than the threshold decrease amount, the setting unit 122 may prohibit the second target vehicle speed from being adjusted on the basis of the decrease in the vehicle speed. In one example, the setting unit 122 may keep the second target vehicle speed constant regardless of the decrease in the vehicle speed. Only when the decrease in the vehicle speed is equal to or greater than the threshold decrease amount, the setting unit 122 may increase the second target vehicle speed as the decrease in the vehicle speed becomes greater. This suppresses an excessive decrease in the second target vehicle speed. Accordingly, it is possible to reduce a feeling of strangeness of driver due to an excessive decrease in the vehicle speed.

Thereafter, in Step S750, the determination unit 121 may determine whether the remaining driving wheels out of the front wheels 11*a* and 11*b* and the rear wheels 11*c* and 11*d* (i.e., the rear wheels 11*c* and 11*d* for forward traveling, or the front wheels 11*a* and 11*b* for backward traveling) have begun onto the step. If the remaining driving wheels are determined as having begun moving onto the step (Step S750: YES), the procedure may proceed to Step S760. In contrast, if the remaining driving wheels are not determined as having begun moving onto the step (Step S750: NO), the determination process in Step S750 may be repeated.

For example, if determining in Step S710 that the front wheels 11*a* and 11*b* have begun moving onto a step, the determination unit 121 may determine in Step S750 whether the rear wheels 11*c* and 11*d* have begun moving onto the step. In contrast, if determining in Step S710 that the rear wheels 11*c* and 11*d* have begun moving onto a step, the determination unit 121 may determine in Step S750 whether the front wheels 11*a* and 11*b* have begun moving onto the step.

Alternatively, the determination process in Step S750 may be performed on the basis of the results of detection by the front-wheel-motor revolution sensor 205*f* and the rear-wheel-motor revolution sensor 205*r* as in Step S710, or may be performed in another method other than that described above. For example, the determination process in Step S750 may be performed on the basis of the result of detection by the acceleration sensor.

If the remaining driving wheels are determined as having begun moving onto the step (Step S750: YES), the setting unit 122 may return the target vehicle speed to the first target vehicle speed in Step S760.

As described above, at the time when the remaining driving wheels are determined as having begun moving onto the step (Step S750: YES), the target vehicle speed may be substantially equal to the second target vehicle speed. In Step S760, the setting unit 122 may change the target vehicle speed from a vehicle speed substantially equal to the second target vehicle speed to the first target vehicle speed.

For example, the setting unit 122 may gradually change the target vehicle speed from the second target vehicle speed to the first target vehicle speed. In other words, the setting unit 122 may cause the target vehicle speed to approach the first target vehicle speed with time. In this case, the change rate of the target vehicle speed may be constant or change over time. For example, the change rate of the target vehicle speed may be set to such a rate that reduces a feeling of strangeness of the driver caused by the change in the vehicle speed.

Thereafter, the control flow illustrated in FIG. 4 may end.

As described above, when the front wheels 11*a* and 11*b* or the rear wheels 11*c* and 11*d* are determined as having moved (or having begun moving) onto a step after the start of the creep traveling control, the controller 120 of the control apparatus 100 may cause the target vehicle speed of the creep traveling control to be lower than the first target vehicle speed until the remaining driving wheels out of the front wheels 11*a* and 11*b* and the rear wheels 11*c* and 11*d* are determined as having moved (having begun moving) onto the step.

In the control flow illustrated in FIG. 4, for example, when that the front wheels 11*a* and 11*b* or the rear wheels 11*c* and 11*d* are determined as having begun moving onto a step, the controller 120 may cause the target vehicle speed of the creep traveling control to approach the actual vehicle speed of the vehicle 1 until the vehicle speed of the vehicle 1 stops decreasing. When the vehicle speed of the vehicle 1 stops decreasing, the controller 120 may change the target vehicle speed of the creep traveling control to the second target vehicle speed that is lower than the first target vehicle speed. This decreases the vehicle speed when the remaining driving wheels out of the front wheels 11*a* and 11*b* and the rear wheels 11*c* and 11*d* are moving onto the step, reducing a shock to be applied to the vehicle 1.

The vehicle speed may be decreased also when the remaining driving wheels out of the front wheels 11*a* and 11*b* and the rear wheels 11*c* and 11*d* are moving onto the step. Thus, when the remaining driving wheels out of the front wheels 11*a* and 11*b* and the rear wheels 11*c* and 11*d* are determined as having begun moving onto the step, the controller 120 may cause the target vehicle speed of the creep traveling control to approach the first target vehicle speed until the vehicle speed of the vehicle 1 stops decreasing. In this case, the controller 120 may change the target vehicle speed of the creep traveling control to the first target vehicle speed after the vehicle speed of the vehicle 1 has stopped decreasing. Note that the decrease in the vehicle speed in this case may be relatively small because a shock to be applied to the vehicle 1 is relatively small when the remaining driving wheels out of the front wheels 11*a* and 11*b* and the rear wheels 11*c* and 11*d* are moving onto the step, as described above.

As described above, the determination as to whether the front wheels 11*a* and 11*b* or the rear wheels 11*c* and 11*d* have moved onto a step may be made on the basis of the results of detection by various sensors. The results of detection may sometimes be erroneous. This is due in part to the results of detection by various sensors are susceptible to change depending on factors other than the movement of the driving wheels onto a step. Thus, in a case where a determination is made that the front wheels 11*a* and 11*b* or the rear wheels 11*c* and 11*d* have moved on to a step and where the determination is determined as being erroneous, the controller 120 may return the target vehicle speed of the creep traveling control to the first target vehicle speed.

For example, in a case where a determination is made that the front wheels 11*a* and 11*b* have moved onto a step after the start of creep traveling control, and where the rear wheels 11*c* and 11*d* are not determined as having moved onto the step within a predetermined period of time in which the rear wheels 11*c* and 11*d* are expected to reach the step, the determination that the front wheels 11a and 11b have moved onto the step may be determined as being erroneous by the controller 120. In this case, the controller 120 may return the target vehicle speed to the first target vehicle speed.

Next, transitions of various state quantities measured when the vehicle 1 is passing through a step under creep traveling control according to a comparative example and those measured when the vehicle 1 is passing through a step under the creep traveling control according to an example embodiment of the technology will now be described in order with reference to FIGS. 5 and 6, respectively.

Figure 5:
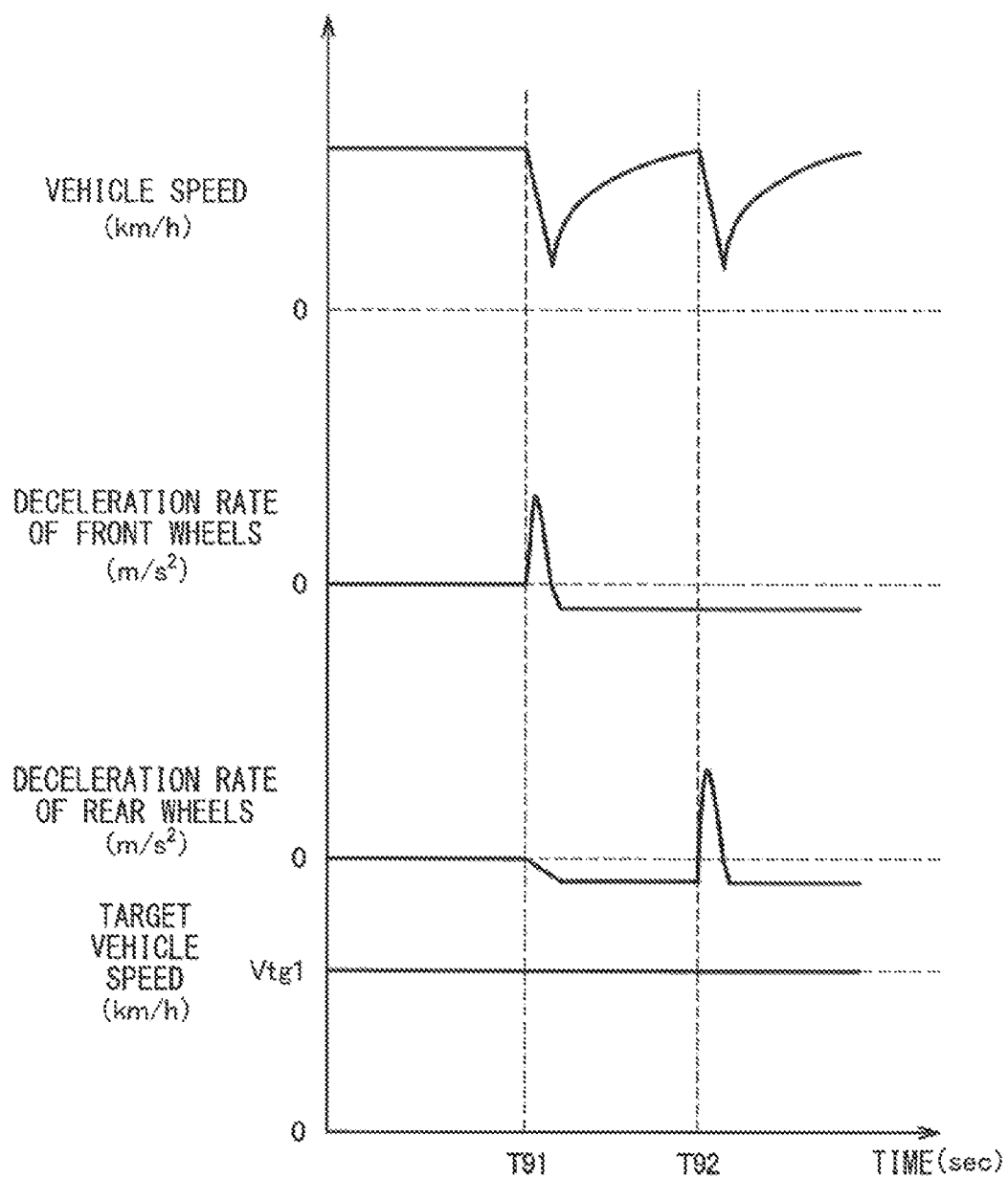
FIG. 5 is a diagram illustrating transitions of various state quantities measured when the vehicle is passing through a step under creep traveling control according to a comparative example.

FIG. 5 illustrates example transitions of various state quantities measured when the vehicle 1 is passing through a step under creep traveling control according to the comparative example. In one example illustrated in FIG. 5, the vehicle 1 is traveling in a forward direction.

Unlike the example embodiment of the technology described above, the determination as to whether the driving wheels has moved onto a step is not made in the comparative example. Instead, the target vehicle speed of the creep traveling control is always kept at the first target vehicle speed Vtg1.

In the example illustrated in FIG. 5, the front wheels 11a and 11b begin moving onto a step at a time T91, which increases the deceleration rate of the front wheels 11a and 11b and decreases the vehicle speed.

Since the target vehicle speed is always kept at the first target vehicle speed Vtg1 in the comparative example, the vehicle speed once decreased is increased to a vehicle speed substantially equal to the vehicle speed at the time T91 when the front wheels 11a and 11b begin moving onto the step, as illustrated in FIG. 5. Thereafter, the rear wheels 11c and 11d begin moving onto the step at a time T92, which increases the deceleration rate of the rear wheels 11c and 11d and decreases the vehicle speed.

Since the target vehicle speed of the creep traveling control is always kept at the first target vehicle speed Vtg1 in the comparative example illustrated in FIG. 5, the vehicle speed at the time T92 when the rear wheels 11c and 11d begin moving onto the step is substantially equal to the vehicle speed at the time T91 when the front wheels 11a and 11b begin moving onto the step. This can give a relatively large shock to the vehicle when the rear wheels 11c and 11d begin moving onto the step, impairing comfortable driving of the driver. This is apparent from FIG. 5 indicating that the decrease in the vehicle speed immediately after the time T92 is substantially equal to the decrease in the vehicle speed immediately after the time T91, and the increase in the deceleration rate of the rear wheels immediately after the time T92 is substantially equal to the increase in the deceleration rate of the front wheels immediately after the time T91.

Figure 6:
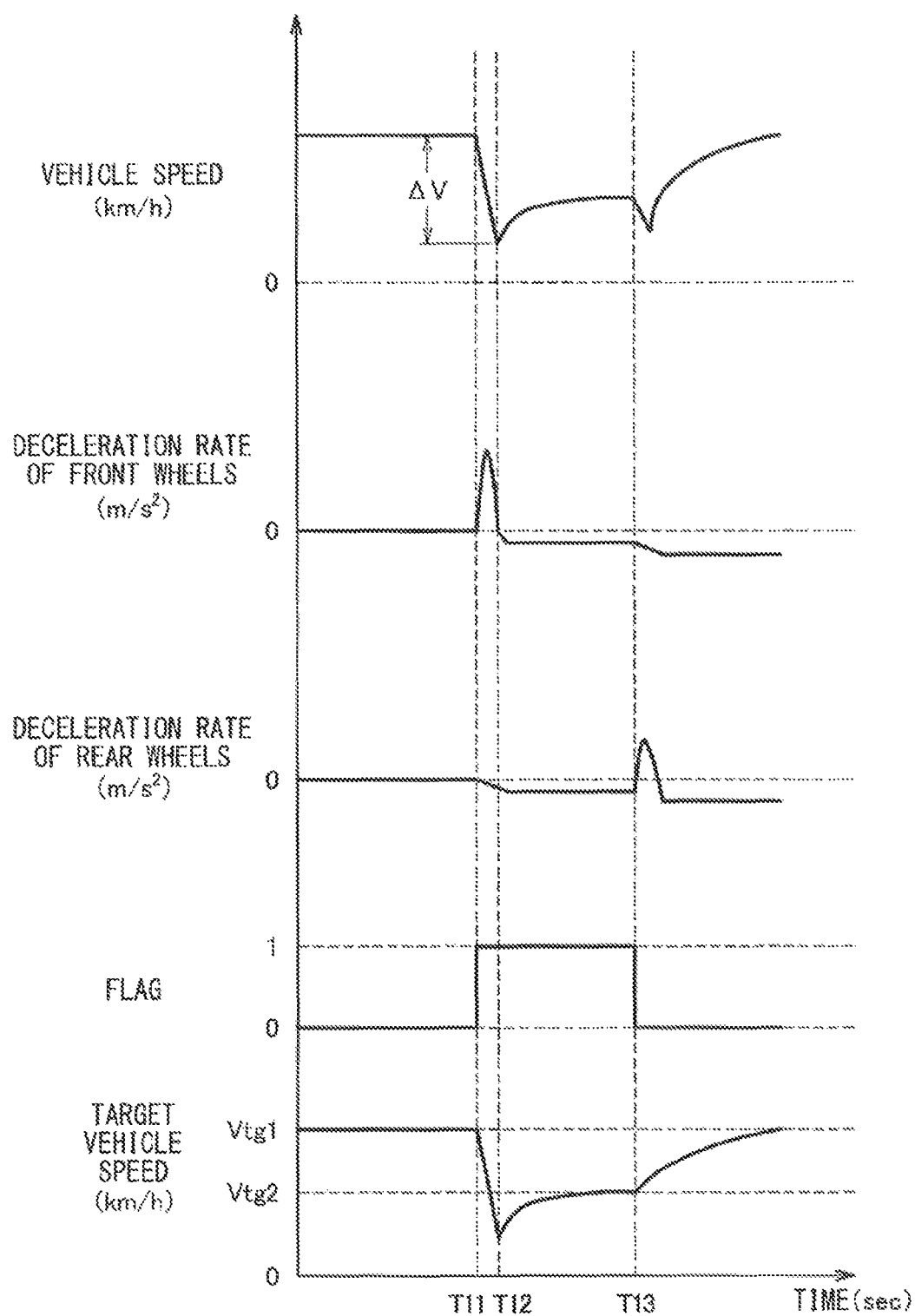
FIG. 6 is a diagram illustrating transitions of various state quantities measured when the vehicle is passing through a step under the creep traveling control according to one example embodiment of the technology.

FIG. 6 illustrates exemplary transitions of various state quantities measured when the vehicle 1 is passing through a step under the creep traveling control according to an example embodiment of the technology. In one example illustrated in FIG. 6, the vehicle 1 is traveling in a forward direction as in the example illustrated in FIG. 5. In the example embodiment, the determination as to whether the driving wheels have moved onto a step is made, as described above. On the basis of the result of the determination, the target vehicle speed of the creep traveling control may be adjusted.

In the example illustrated in FIG. 6, the target vehicle speed may be adjusted by use of a flag. The flag may be set at 1 (one) in a period of time from the determination that the front wheels 11a and 11b or the rear wheels 11c and 11d (e.g., the front wheels 11a and 11b in the example of FIG. 6) have begun moving onto a step to the determination that the remaining driving wheels (e.g., the rear wheels 11c and 11d in the example of FIG. 6) have begun moving onto the step. In other period of time, the flag may be set at 0 (zero). The value of the flag may be stored in a storage in the control apparatus 100, for example. When the flag indicates 1, the controller 120 may cause the target vehicle speed of the creep traveling control to be lower than the first target vehicle speed Vtg1. In the example illustrated in FIG. 6, the front wheels 11a and 11b begin moving onto a step at a time T11, which increases the deceleration rate of the front wheels 11a and 11b and decreases the vehicle speed.

In the example illustrated in FIG. 6, the target vehicle speed may be controlled to approach the actual target speed of the vehicle 1 in a period of time from the time T11 when the front wheels 11a and 11b are determined as having begun moving onto the step to a time T12 when the vehicle speed stops decreasing.

After the vehicle speed stops decreasing at the time T12, the target vehicle speed may be changed to a second target vehicle speed Vtg2 that is lower than the first target vehicle speed Vtg1. As illustrated in the example of FIG. 6, the target vehicle speed may be gradually changed to the second target vehicle speed Vtg2 after the time T12; however, the target vehicle speed may be rapidly changed to the second target vehicle speed Vtg2. Additionally, the second target vehicle speed Vtg2 may be adjusted on the basis of a decrease $\Delta V$ in the vehicle speed after the time T11 when the front wheels 11a and 11b are determined as having begun moving onto a step, as described above.

Thereafter, the rear wheels 11c and 11d begin moving onto the step at a time T13, which increases the deceleration rate of the rear wheels and decreases the vehicle speed.

In the example illustrated in FIG. 6, it may be determined that the rear wheels 11c and 11d have begun moving onto the step at the time T13, and the target vehicle speed may be returned to the first target vehicle speed Vtg1 after the time T13. As illustrated in the example of FIG. 6, the target vehicle speed may be gradually changed to the first target vehicle speed Vtg1 after the time T13; however, the target vehicle speed may be rapidly changed to the first target vehicle speed Vtg1.

In the example according to an example embodiment illustrated in FIG. 6 described above, when the front wheels 11a and 11b are determined as having begun moving onto a step at the time T11, the target vehicle speed of the creep traveling control may be kept lower than the first target vehicle speed Vtg1 until the rear wheels 11c and 11d are determined as having begun moving onto the step at the time T13. This allows the vehicle speed at the time T13 when the rear wheels 11c and 11d begin moving onto the step to be lower than the vehicle speed at the time T11 when the front wheels 11a and 11b begin moving onto the step, reducing a shock to be applied to the vehicle 1 when the rear wheels 11c and 11d are moving onto the step. This prevents comfortable driving of the driver from being impaired. This is apparent from FIG. 6 indicating that the decrease in the vehicle speed immediately after the time T13 is smaller than that immediately after the time T11 (i.e., the decrease $\Delta V$), and the increase in the deceleration rate of the rear wheels immediately after the time T13 is smaller than the increase in the deceleration rate of the front wheels immediately after the time T11.

[Example Effects of Control Apparatus]

Example effects of the control apparatus 100 according to at least one of the example embodiments of the technology will now be described.

The control apparatus 100 according to an example embodiment of the technology includes the controller 120 that performs the creep traveling control in which the vehicle 1 is caused to travel regardless of an accelerator operation. Additionally, when the front wheels 11a and 11b or the rear wheels 11c and 11d are determined as having moved onto a step after the start of the creep traveling control, the controller 120 cause the target vehicle speed of the creep traveling control to be lower than the first target vehicle speed until the remaining driving wheels are determined as having moved onto the step. In other words the controller 120 causes the target vehicle speed of the creep traveling control to be lower than the target vehicle speed detected before the front wheels 11a and 11b or the rear wheels 11c and 11d are determined as having moved onto the step. This decreases the vehicle speed when the remaining driving wheels are moving onto the step, reducing a shock to be applied to the vehicle 1 at this time. In this way, it is possible for the control apparatus 100 according to at least one of the example embodiments to reduce a shock to be applied to the vehicle 1 under the creep traveling control.

The controller 120 of the control apparatus 100 according to at least one of the example embodiments may determine whether the front wheels 11a and 11b have moved onto a step on the basis of the result of detection by the front-wheel-motor revolution sensor 205f, and may determine whether the rear wheels 11c and 11d have moved onto the step on the basis of the result of detection by the rear-wheel-motor revolution sensor 205r. This improves accuracy of the determination as to whether the driving wheels have moved onto a step. This also facilitate an appropriate determination as to which driving wheels out of the front wheels 11a and 11b and the rear wheels 11c and 11d have moved on the step.

When the front wheels 11a and 11b or the rear wheels 11c and 11d are determined as having begun moving onto a step, the controller 120 of the control apparatus 100 according to at least one of the example embodiments cause the target vehicle speed of the creep traveling control to approach the actual vehicle speed of the vehicle 1 until the actual vehicle speed of the vehicle 1 stops decreasing. After the actual vehicle speed of the vehicle 1 has stopped decreasing, the controller 120 may change the target vehicle speed of the creep traveling control to the second target vehicle speed that is lower than the first target vehicle speed. This suppresses an application of an excessively large driving force to the vehicle 1 while the actual vehicle speed is decreasing due to the movement of the front wheels 11a and 11b or the rear wheels 11c and 11d onto a step. Accordingly, it is possible to reduce a feeling of strangeness of the driver.

In a case where the front wheels 11a and 11b or the rear wheels 11c and 11d are determined as having begun moving onto a step and where the actual vehicle speed of the vehicle 1 stops decreasing, the controller 120 of the control apparatus 100 according to at least one of the example embodiments of the technology may gradually change the target vehicle speed of the creep traveling control to the second target vehicle speed. This suppresses a rapid change in the actual vehicle speed after the front wheels 11a and 11b or the rear wheels 11c and 11d begin moving onto a step.

The controller 120 of the control apparatus 100 according to at least one of the example embodiments of the technology may adjust the second target vehicle speed on the basis of the decrease in the actual vehicle speed of the vehicle 1 detected after the front wheels 11a and 11b or the rear wheels 11c and 11d are determined as having begun moving onto a step. This allows the second target vehicle speed to be adjusted on the basis of the vehicle speed required to move the driving wheels onto the step. Accordingly, it is possible to move the remaining driving wheels out of the front wheels 11a and 11b and the rear wheels 11c and 11d onto the step while suppressing a shock to be applied to the vehicle 1.

The controller 120 of the control apparatus 100 according to at least one of the example embodiments of the technology may increase the second target vehicle speed as the decrease in the vehicle speed of the vehicle 1 becomes greater after the front wheels 11a and 11b or the rear wheels 11c and 11d are determined as having begun moving onto a step. This allows the second target vehicle speed to be more appropriately adjusted on the basis of the vehicle speed required to move the driving wheels onto the step. Accordingly, it is possible to move the remaining driving wheels out of the front wheels 11a and 11b and the rear wheels 11c and 11d onto the step while suppressing a shock to be applied to the vehicle 1.

In a case where the front wheels 11a and 11b or the rear wheels 11c and 11d are determined as having begun moving onto a step and where the decrease in the vehicle speed of the vehicle 1 after the determination is less than the threshold decrease amount, the controller 120 of the control apparatus 100 according to at least one of the example embodiments of the technology may prohibit the second target vehicle speed from being adjusted on the basis of the decrease in the vehicle speed. This prevents the second target vehicle speed from being excessively low. The driver is thereby prevented from having a feeling of strangeness caused by excessively low vehicle speed. Accordingly, it is possible to appropriately move the remaining driving wheels out of the front wheels 11a and 11b and the rear wheels 11c and 11d onto the step while reducing a feeling of strangeness of the driver and reducing a shock to be applied to the vehicle 1.

When the remaining driving wheels out of the front wheels 11a and 11b and the rear wheels 11c and 11d are determined as having moved onto the step, the controller 120 of the control apparatus 100 according to at least one of the example embodiments of the technology may return the target vehicle speed of the creep traveling control to the first target vehicle speed. This prevents the vehicle speed from being excessively low after all of the front wheels 11a and 11b and the rear wheels 11c and 11d have moved onto the step.

When the remaining driving wheels out of the front wheels 11a and 11b and the rear wheels 11c and 11d are determined as having moved onto the step, the controller 120 of the control apparatus 100 according to at least one of the example embodiments of the technology may gradually change the target vehicle speed of the creep traveling control to the first target vehicle speed. Accordingly, it is possible to suppress a rapid change in the vehicle speed after all of the front wheels 11a and 11b and the rear wheels 11c and 11d have moved onto the step, while preventing the vehicle speed from being excessively low.

In a case where a determination is made that the front wheels 11a and 11b or the rear wheels 11c and 11d have moved onto a step and where the determination is determined as being erroneous afterwards, the controller 120 of the control apparatus 100 according to at least one of the example embodiments of the technology may return the target vehicle speed of the creep traveling control to the first target vehicle speed. Accordingly, it is possible to prevent the vehicle speed from being kept excessively low when the vehicle 1 pass through any places other than a step.

Some embodiments of the technology are described in detail above with reference to the accompanying drawings. It should be appreciated that the embodiments of the technology described above are mere examples and are not intended to limit the scope of the technology. It should be also appreciated that various omissions, replacements, and modifications may be made in the foregoing embodiments described herein, without departing from the scope of the technology. The technology is intended to include such modifications and alterations in so far as they fall within the scope of the appended claims or the equivalents thereof.

For example, in at least one of the example embodiments described above, the vehicle 1 is an electric vehicle including the front-wheel motor 15f and the rear-wheel motor 15r as power sources; however, the vehicle including the control apparatus according to at least one of the example embodiments of the technology should not be limited to the vehicle 1. For example, the vehicle including the control apparatus according to at least one of the example embodiments of the technology may be an electric vehicle provided with different driving motors that are provided on respective driving wheels. That is, four driving motors may be provided. Alternatively, the vehicle including the control apparatus according to at least one of the example embodiments of the technology may be a hybrid vehicle that includes a driving motor and an engine as power sources or may be an engine-powered vehicle that includes only an engine as a power source. These vehicles are configured to perform the creep traveling control in which the outputs of the power sources are controlled, as in the vehicle 1. Still alternatively, the vehicle including the control apparatus according to at least one of the example embodiments of the technology may be the vehicle 1 illustrated in FIG. 1 to which some components are added, of which configuration is modified, or from which some components are removed.

In at least one of the embodiments described above, the determination is made as to whether the paired front wheels or the paired rear wheels have moved onto a step. Alternatively, a determination may be made as to whether one or both of the front wheels or one or both of the rear wheels have moved onto a step.

For example, some of the steps of the process described herein with reference to the flowchart are not necessarily executed in the order indicated by the flowchart. Optionally, additional steps may be included in the process or some of the steps of the process may be omitted.

The controller 120 in the control apparatus 100 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 120. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and an NVRAM. The ASIC is an integrated circuit (IC) customized to perform, and the FPGA is an integrated circuit designed to be configured after manufacturing in order to perform, all or a part of the functions of the controller 120 in the control apparatus 100 illustrated in FIG. 2.

The invention claimed is:

1. A vehicle control apparatus comprising:
a controller configured to start creep traveling control when a brake pedal is released without an accelerator operation while a vehicle is stopped,
wherein upon starting the creep traveling control, the controller sets a target vehicle speed of the creep traveling control to a first target vehicle speed,
wherein in response to detecting one or both of front wheels or one or both of rear wheels having begun moving onto a step while the vehicle travels under the creep traveling control in which the target vehicle speed is set to the first target vehicle speed, the controller changes the target vehicle speed of the creep traveling control from the first target vehicle speed to an actual vehicle speed of the vehicle,
wherein the actual vehicle speed of the vehicle being set as the target vehicle speed of the creep traveling control decreases as the one or both of the front wheels or the one or both of the rear wheels move onto the step,
wherein when the actual vehicle speed of the vehicle stops decreasing while the vehicle travels under the creep traveling control in which the target vehicle speed is set to the actual vehicle speed, the controller changes the target vehicle speed of the creep traveling control from the actual vehicle speed to a second target vehicle speed, the second target vehicle speed being a speed lower than the first target vehicle speed, and
wherein the controller controls the vehicle to travel under the creep traveling control in which the target vehicle speed is set to the second target vehicle speed until remaining wheels out of the front wheels and the rear wheels are determined to have moved onto the step.

2. The vehicle control apparatus according to claim 1, wherein
the vehicle comprises:
a first motor configured to output a driving force to drive the one or both front wheels;
a second motor configured to output a driving force to drive the one or both rear wheels;
a first revolution sensor configured to detect a number of revolutions of the first motor; and
a second revolution sensor configured to detect a number of revolutions of the second motor, and
the controller
determines whether the one or both of the front wheels have moved onto the step on a basis of a result of detection by the first revolution sensor, and
determines whether the one or both of the rear wheels have moved onto the step on a basis of a result of detection by the second revolution sensor.

3. The vehicle control apparatus according to claim 2, wherein when remaining wheels out of the front wheels and the rear wheels are determined as having moved onto the step by the controller, the controller returns the target vehicle speed of the creep traveling control to the first target vehicle speed.

4. The vehicle control apparatus according to claim 3, wherein when the remaining wheels out of the front wheels and the rear wheels are determined as having moved onto the step by the controller, the controller gradually changes the target vehicle speed of the creep traveling control to the first target vehicle speed.

5. The vehicle control apparatus according to claim 2, wherein in a case where a determination is made by the controller that the one or both of the front wheels or the one or both of the rear wheels have moved onto the step and where the determination is determined as being erroneous by the controller, the controller return the target vehicle speed of the creep traveling control to the first target vehicle speed.

6. The vehicle control apparatus according to claim 1, wherein in a case where the one or both of the front wheels or the one or both of the rear wheels are determined as having begun moving onto the step by the controller, and where the actual vehicle speed of the vehicle has stopped decreasing, the controller gradually changes the target vehicle speed of the creep traveling control to the second target vehicle speed.

7. The vehicle control apparatus according to claim 6, wherein the controller adjusts the second target vehicle speed on a basis of a decrease in the actual vehicle speed of the vehicle after the one or both of the front wheels or the one or both of the rear wheels are determined as having begun moving onto the step by the controller.

8. The vehicle control apparatus according to claim 7, wherein the controller increases the second target vehicle speed as the decrease in the actual vehicle speed of the vehicle becomes greater after the one or both of the front wheels or the one or both of the rear wheels are determined as having begun moving onto the step by the controller.

9. The vehicle control apparatus according to claim 8, wherein when the decrease in the actual vehicle speed of the vehicle becomes less than a threshold after the one or both of the front wheels or the one or both of the rear wheels are determined as having begun moving onto the step by the controller, the controller prohibits the second target vehicle speed from being adjusted on a basis of the decrease in the actual vehicle speed.

10. The vehicle control apparatus according to claim 1, wherein the controller adjusts the second target vehicle speed on a basis of a decrease in the actual vehicle speed of the vehicle after the one or both of the front wheels or the one or both of the rear wheels are determined as having begun moving onto the step by the controller.

11. The vehicle control apparatus according to claim 10, wherein the controller increases the second target vehicle speed as the decrease in the actual vehicle speed of the vehicle becomes greater after the one or both of the front wheels or the one or both of the rear wheels are determined as having begun moving onto the step by the controller.

12. The vehicle control apparatus according to claim 11, wherein when the decrease in the actual vehicle speed of the vehicle becomes less than a threshold after the one or both of the front wheels or the one or both of the rear wheels are determined as having begun moving onto the step by the controller, the controller prohibits the second target vehicle speed from being adjusted on a basis of the decrease in the actual vehicle speed.

13. The vehicle control apparatus according to claim 1, wherein when remaining wheels out of the front wheels and the rear wheels are determined as having moved onto the step by the controller, the controller returns the target vehicle speed of the creep traveling control to the first target vehicle speed.

14. The vehicle control apparatus according to claim 13, wherein when the remaining wheels out of the front wheels and the rear wheels are determined as having moved onto the step by the controller, the controller gradually changes the target vehicle speed of the creep traveling control to the first target vehicle speed.

15. The vehicle control apparatus according to claim 1, wherein in a case where a determination is made by the controller that the one or both of the front wheels or the one or both of the rear wheels have moved onto the step and where the determination is determined as being erroneous by the controller, the controller return the target vehicle speed of the creep traveling control to the first target vehicle speed.

16. A vehicle control apparatus comprising
circuitry configured to start creep traveling control when a brake pedal is released without an accelerator operation while a vehicle is stopped,
wherein upon starting the creep traveling control, the circuitry sets a target vehicle speed of the creep traveling control to a first target vehicle speed,
wherein in response to detecting one or both of front wheels or one or both of rear wheels as having begun moving onto a step while the vehicle travels under the creep traveling control in which the target vehicle speed is set to the first target vehicle speed, the circuitry changes the target vehicle speed of the creep traveling control from the first target vehicle speed to an actual vehicle speed of the vehicle,
wherein the actual vehicle speed of the vehicle being set as the target vehicle speed of the creep traveling control decreases as the one or both of the front wheels or the one or both of the rear wheels move onto the step,
wherein when the actual vehicle speed of the vehicle stops decreasing while the vehicle travels under the creep traveling control in which the target vehicle speed is set to the actual vehicle speed, the circuitry changes the target vehicle speed of the creep traveling control from the actual vehicle speed to a second target vehicle speed, the second target vehicle speed being a speed lower than the first target vehicle speed, and
wherein the circuitry controls the vehicle to travel under the creep traveling control in which the target vehicle speed is set to the second target vehicle speed until remaining wheels out of the front wheels and the rear wheels are determined to have moved onto the step.

17. A vehicle control apparatus for a vehicle, the vehicle comprising a front wheel, a rear wheel, a first motor connected to the front wheel, a second motor connected to the rear wheel, a speed sensor configured to detect an vehicle speed of the vehicle, a first revolution sensor configured to detect a number of revolutions of the first motor; and a second revolution sensor configured to detect a number of revolutions of the second motor, the vehicle control apparatus comprising:
circuitry configured to:
start creep traveling control in which the vehicle travels at a target vehicle speed by driving force output by one or both of the first and second motors when a brake pedal is released without an accelerator operation while the vehicle is stopped;
while the creep traveling control is executed, determine, among the front wheel and the rear wheel, the one located on a front side in a current traveling direction as a first wheel and the one located on a rear side in the current traveling direction as a second wheel;
in response to starting the creep traveling control, set the target vehicle speed of the creep traveling control to a first target vehicle speed and determine whether a first deceleration rate of the first wheel is greater than a first predetermined value based on the detected number of revolutions of the first or second motors, the first predetermined value is positive;
in response to determining that the first deceleration rate of the first wheel is greater than the first predetermined value, determine whether the detected vehicle speed has decreased and then starts to increase;

in response to determining that the detected vehicle speed has decreased and then starts to increase, determine whether a second deceleration rate of the second wheel is greater than a second predetermined value based on the detected number of revolutions of the first or second motors, the second predetermined value is positive;

in a period from the determining that the first deceleration rate of the first wheel is greater than the first predetermined value to the determining that the detected vehicle speed has decreased and then starts to increase, continues to change the target vehicle speed to make the target speed equal to the most recently detected vehicle speed;

in a period from the determining that the detected vehicle speed has decreased and then starts to increase to the determining that the second deceleration rate of the second wheel is greater than the second predetermined value, set the target vehicle speed to a second target speed, the second target speed is lower than the first target vehicle speed; and in response to determining that the second deceleration rate of the second wheel is greater than the second predetermined value, set the target vehicle speed to the first target speed.

18. The vehicle control apparatus according to claim 17, wherein the circuitry is configured to gradually changes the target vehicle speed to the second target speed in the period from the determining that the detected vehicle speed has decreased and then starts to increase to the determining that the second deceleration rate of the second wheel is greater than the second predetermined value.

19. The vehicle control apparatus according to claim 17, wherein the circuitry is configured to adjust the second target speed based on a decrease amount in the detected vehicle speed in the period from the determining that the first deceleration rate of the first wheel is greater than the first predetermined value to the determining that the detected vehicle speed has decreased and then starts to increase.

* * * * *